United States Patent
Lauwers et al.

(10) Patent No.: US 8,474,605 B2
(45) Date of Patent: Jul. 2, 2013

(54) CONVEYOR DRIVE SHAFT ASSEMBLY WITH INTEGRATED TORQUE LIMITING DEVICE

(75) Inventors: Andrew V. Lauwers, Stevens, PA (US); Robert Steward Boyd, Mount Joy, PA (US)

(73) Assignee: CNH America LLC, New Holland, PA (US)

( * ) Notice: Subject to any disclaimer, the term of this patent is extended or adjusted under 35 U.S.C. 154(b) by 257 days.

(21) Appl. No.: 12/872,446

(22) Filed: Aug. 31, 2010

(65) Prior Publication Data

US 2012/0048687 A1    Mar. 1, 2012

(51) Int. Cl.
*B60P 1/36* (2006.01)

(52) U.S. Cl.
USPC .......... 198/834; 56/10.3; 192/56.1; 192/56.2; 192/76

(58) Field of Classification Search
USPC ................. 198/832–835; 56/10.3, 11.3, 14.3, 56/14.4, 92, 345–353; 192/54.1, 56.1, 56.2, 192/74–76, 89.2
See application file for complete search history.

(56) References Cited

U.S. PATENT DOCUMENTS

| | | | |
|---|---|---|---|
| 1,594,259 A * | 7/1926 | Hardman | 192/76 |
| 3,001,622 A * | 9/1961 | Goldberg | 192/76 |
| 3,766,721 A | 10/1973 | Linsmeier | |
| 3,958,397 A | 5/1976 | Stiff | |
| 3,971,147 A * | 7/1976 | Hyler | 37/423 |
| 4,013,163 A * | 3/1977 | Gaal | 198/575 |
| 4,103,516 A | 8/1978 | Marcin | |
| 4,143,525 A | 3/1979 | Major | |
| 4,164,995 A | 8/1979 | McFarland | |
| 4,179,024 A * | 12/1979 | Boersma | 198/806 |
| 4,286,441 A | 9/1981 | Scheneman, Jr. | |
| 4,321,991 A | 3/1982 | Teijido | |
| 4,366,899 A | 1/1983 | Doro | |
| 4,548,316 A * | 10/1985 | Maurer | 198/832.2 |
| 4,944,379 A | 7/1990 | Haaser | |
| 5,881,862 A | 3/1999 | Fishaw | |
| 6,247,691 B1 | 6/2001 | Drago | |
| 6,464,217 B1 | 10/2002 | Kulpa | |
| 6,739,439 B2 | 5/2004 | Moeller | |
| 2011/0135363 A1 * | 6/2011 | Funayanagi et al. | 399/397 |

* cited by examiner

*Primary Examiner* — Mark A Deuble
(74) *Attorney, Agent, or Firm* — Patrick M. Sheldrake (57) ABSTRACT

A conveyor drive shaft for use in agricultural combines including an integral torque limiting device is disclosed herein. More particularly, a co-axial integrated torque limiter, such as an radial pin clutch, is provided in such a conveyor drive shaft to minimize additional space claim required to protect the conveyor drive shaft, and attached components from damage in the event of an unexpected jam or other stoppage. A conveyor system employing such an integrated conveyor drive shaft and a combine employing such a conveyor system are also disclosed.

7 Claims, 8 Drawing Sheets

CONVEYOR DRIVE SHAFT ASSEMBLY WITH INTEGRATED TORQUE LIMITING DEVICE

TECHNOLOGY FIELD

The present invention relates generally to combine harvesters, and more particularly to the conveyor system used to carry crop from the header into the threshing system of the machine. Most particularly, the invention relates to a conveyor drive shaft assembly with an integrated torque limiting device.

BACKGROUND

Many combine harvesters employ the use of a conveyor to carry crop from the header into the threshing system of the machine. Typically the conveyor is comprised of an idler and a shaft assembly, having a looped chain passing around each assembly engaged by a sprocket. Typically, the conveyor is powered via a drive gear affixed to one of the shaft assemblies, thereby driving the looped chain. In most instances, each shaft assembly has a plurality of sprockets and a plurality of chains. In some systems, crop grabbing members are affixed to the chains such that as the sprocket and shaft assembly turns, the chain and grabbing members are moved as a result. The crop material is thus conveyed from the ground to the threshing (or other) system of the machine. The sprocket and shaft assemblies may be an assembly of lose components or a single piece welded assembly.

Due to the nature of the operating environment, this conveyor system needs to be protected from excessive loading caused by foreign objects. On occasion, a rock or other foreign object can cause the conveyor to partially or completely jam. In these instances, the gear can continue to drive the assembly creating unwanted forces in the shaft assembly and consequently in the chains. Damage to the gear, driver motor, shaft assembly and/or chain(s) can result. Aside from the cost of maintenance, such damage also results in down time and loss of crop harvest, which is undesirable.

Some currently available combines offer an optional mechanical rock detection system in which a high speed beater is used to discharge rocks and other foreign objects from the crop material as it is conveyed into the machine. In many combines, each of the conveyor and the beater is driven separately. Thus, the conveyor and its driver as well as the beater and its driver are handled separately, and each could be subject to jamming, although it is more common in the conveyor section.

In some combines, such as the flagship Axial Flow combines manufactured by CaseIH, the rock trap configuration includes a single gearbox that supplies power to both the conveyor drive shaft and rock trap beater. Due to packaging and driveline constraints, the configuration of this gearbox is such that the conveyor drive shaft and beater are mechanically connected to one another through the internal gear set, and a torque limiting device, in this case a wet fiction disk clutch, which is located between this gear set and the gear box input. As a result of this gearbox configuration, the inertia generated by these two rotating devices is connected as well. Therefore in the event that the conveyor is stopped suddenly by a foreign object, the inertia of the heavy, high speed beater must be stopped as well, or those forces will be applied to the conveyor and its drive system. As described above, such forces can cause damage to the conveyor drive system, the shaft assembly or the chains.

A conveyor assembly, driveline, and support structure design capable of stopping this inertial load would be excessively heavy and costly. Accordingly, another solution is needed.

Accordingly, better ways of absorbing, controlling, limiting, stopping, or preventing excess forces from developing in the conveyor system or its driveline, are needed. Specifically, a way of isolating the conveyor system, in single gear box setups, from the heavy rock trap beater is needed. The invention disclosed herein is useful for each of these situations and is a marked improvement which should result in less damage and downtime.

SUMMARY

Embodiments of the present invention address and overcome one or more of the above shortcomings and drawbacks, by providing devices, and systems, for isolating the conveyor drive shaft from other components. This technology is particularly well-suited for, but by no means limited to, use in agricultural combines.

In some embodiments, the invention provides a conveyor drive shaft assembly comprising a longitudinal drive shaft comprising a first end and an opposed second end; the first end further comprising a drive hub; the drive hub comprising an integral torque limiter adapted for coupling the drive hub to a gear drive shaft.

In some embodiments, the integral torque limiter is adapted to slip at about 800 ft-lb to about 1300 ft-lb. In some embodiments it is adapted to slip at about 800 ft-lb to about 1000 ft-lb. In some embodiments, it is adapted slip at about 1000 lb-ft. In some embodiments the ft-lb may be manually or automatically adjusted according to In some embodiments, the integral torque limiter is a radial pin clutch arranged and affixed co-axially with respect to the longitudinal drive shaft.

In some embodiments, the radial pin clutch comprises an outer hub affixed to the conveyor drive shaft; an inner hub affixed for rotation within the outer hub and for engagement with a drive shaft; wherein the inner hub is adapted for frictional engagement of the outer hub such that rotation of the inner hub causes rotation of the outer hub until a predetermined upper torque limit is achieved, whereupon the inner hub slips and rotates freely of the outer hub.

In some embodiments, the conveyor drive shaft is provided with a plurality of sprockets arranged and displaced along the length of the longitudinal drive shaft.

Some embodiments of the invention provide an agricultural combine feeder assembly comprising a conveyor drive shaft assembly comprising a longitudinal drive shaft comprising a first end and an opposed second end; the first end further comprising a drive hub; the drive hub comprising an integral torque limiter adapted for coupling the drive hub to a gear drive shaft; a plurality of sprockets arranged and displaced along the length of the longitudinal drive shaft; a lower conveyor idler, a plurality of chain loops, connecting the plurality of sprockets of the conveyor drive shaft to the lower conveyor idler for rotation therewith.

In some embodiments, the integral torque limiter is a radial pin clutch comprising an outer hub affixed to the conveyor drive shaft; an inner hub affixed for rotation within the outer hub and for engagement with a drive shaft; wherein the inner hub is adapted for frictional engagement of the outer hub such that rotation of the inner hub causes rotation of the outer hub until a predetermined upper torque limit is achieved, whereupon the inner hub slips and rotates freely of the outer hub.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The above problems in the prior art have motivated the creation of a system wherein the conveyor drive shaft can be isolated from its gear drive shaft to avoid excessive torque and resultant damage to the conveyor and other parts.

The system limits the torque that can be transferred to the conveyor by placing a torque limiting device between the sprockets that drive the conveyor and the power output of the gearbox. This separates the energy from the gear drive shaft and, if applicable, the inertia of the rock trap beater from that of the chain. This in turn results in less energy that the conveyor assembly has to absorb if the conveyor were to stop suddenly due to a foreign object or other plug event.

In some embodiments, the torque limiting device is integral to the conveyor drive shaft. This allows for easy manufacture and retrofit to maintain the current gear driven driveline while allowing the inertias of the beater and the conveyor to be isolated from one another. Having an integrated torque limiting device is adaptable to many designs currently in use, whether a rugged weld design or a drive shaft comprising component parts. Integrating the torque limiting device into the conveyor drive assembly adds little mass to the system and thus minimizes the amount of inertia added to the system.

Although the invention is described in detail here with the torque limiter integrated in to the conveyor drive shaft, it is also contemplated that the torque limiter could be integrated into the gear drive shaft and/or the rock trap beater shaft or its gear drive shaft, or any combination thereof.

Figure 5:
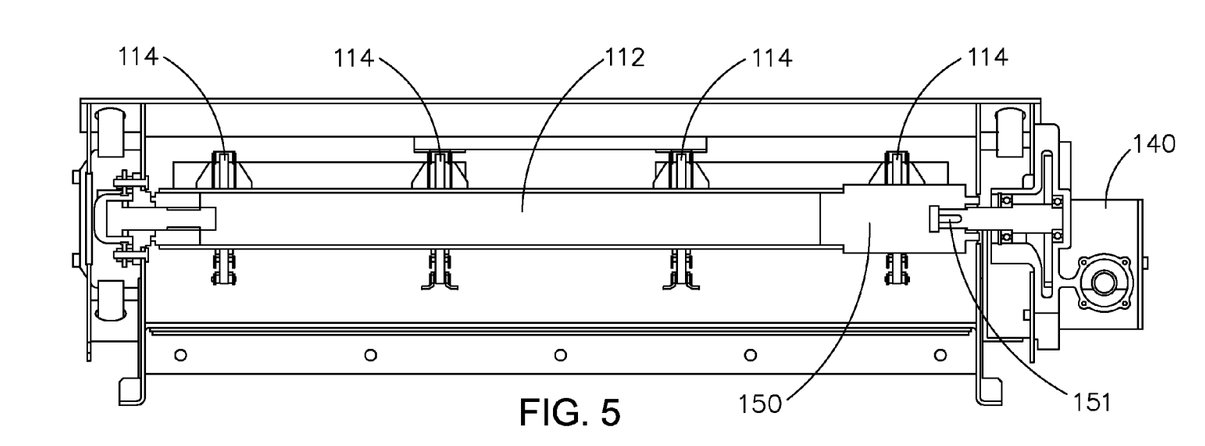
FIG. 5 is a cross-sectional view taken along line A-A of FIG. 2.
Figure 6:
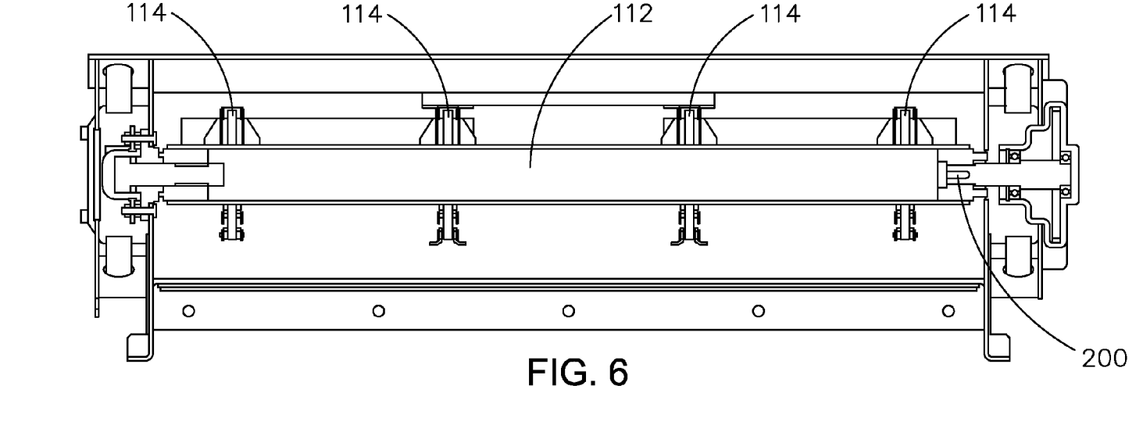
FIG. 6 is a cross-section view taken along a similar line of a traditional conveyor assembly.
Figure 7:
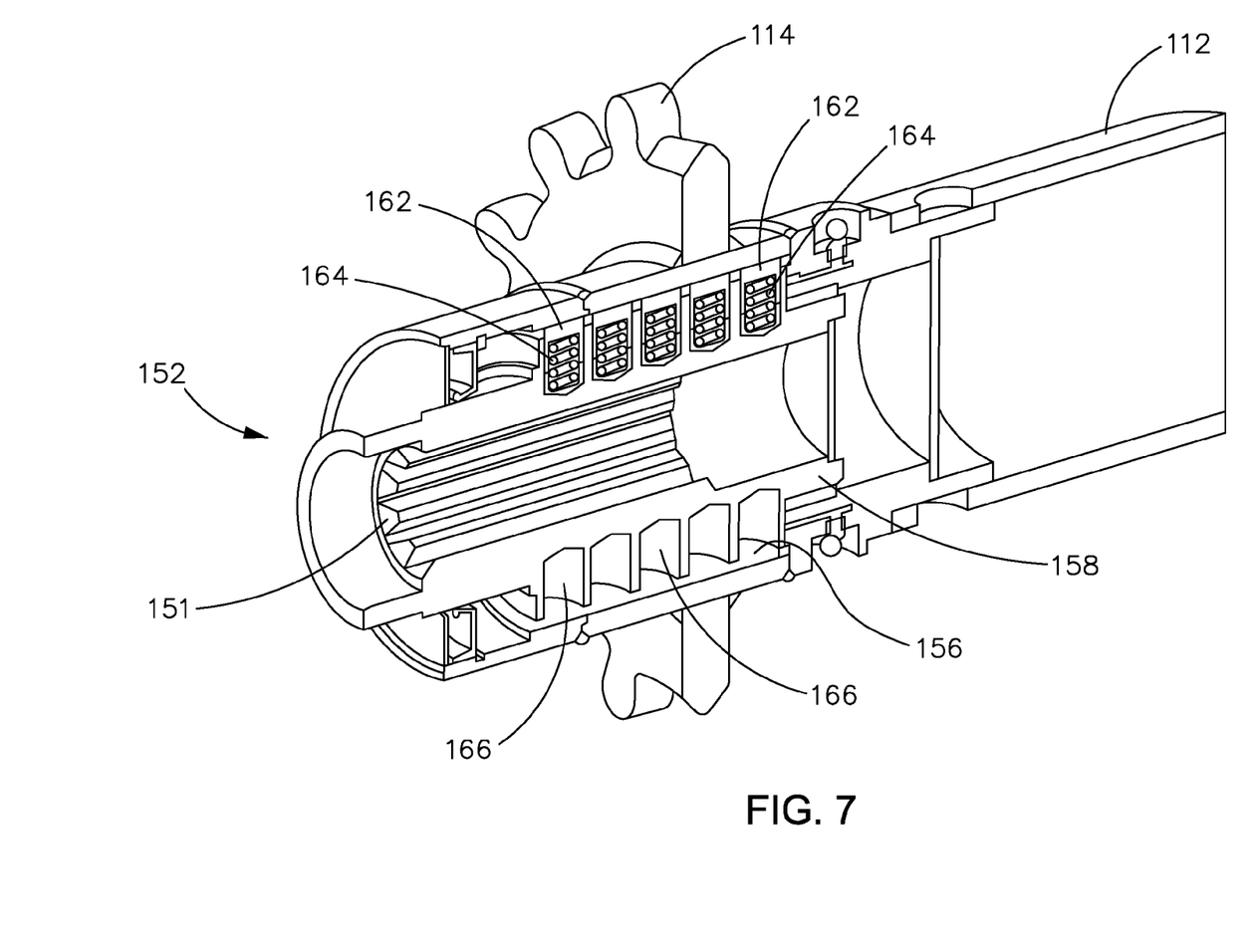
FIG. 7 is a cross-sectional view of the drive end of one embodiment of the conveyor drive shaft assembly with integral torque limiting device as described herein.
Figure 8:
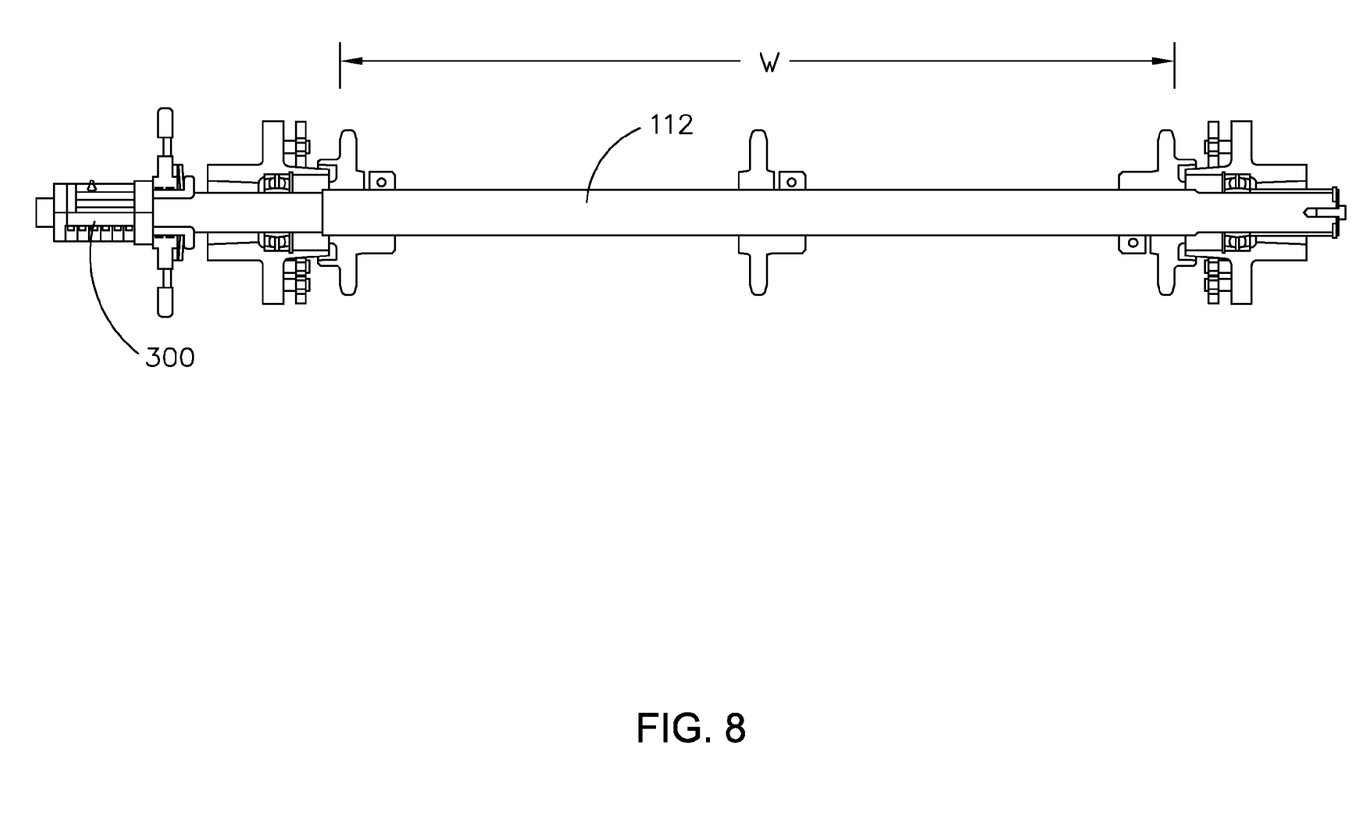
FIG. 8 is a cross-section view of one embodiment of a conveyor drive shaft assembly with a separate, external torque limiting device, in this case an external radial pin clutch.
Figure 9:
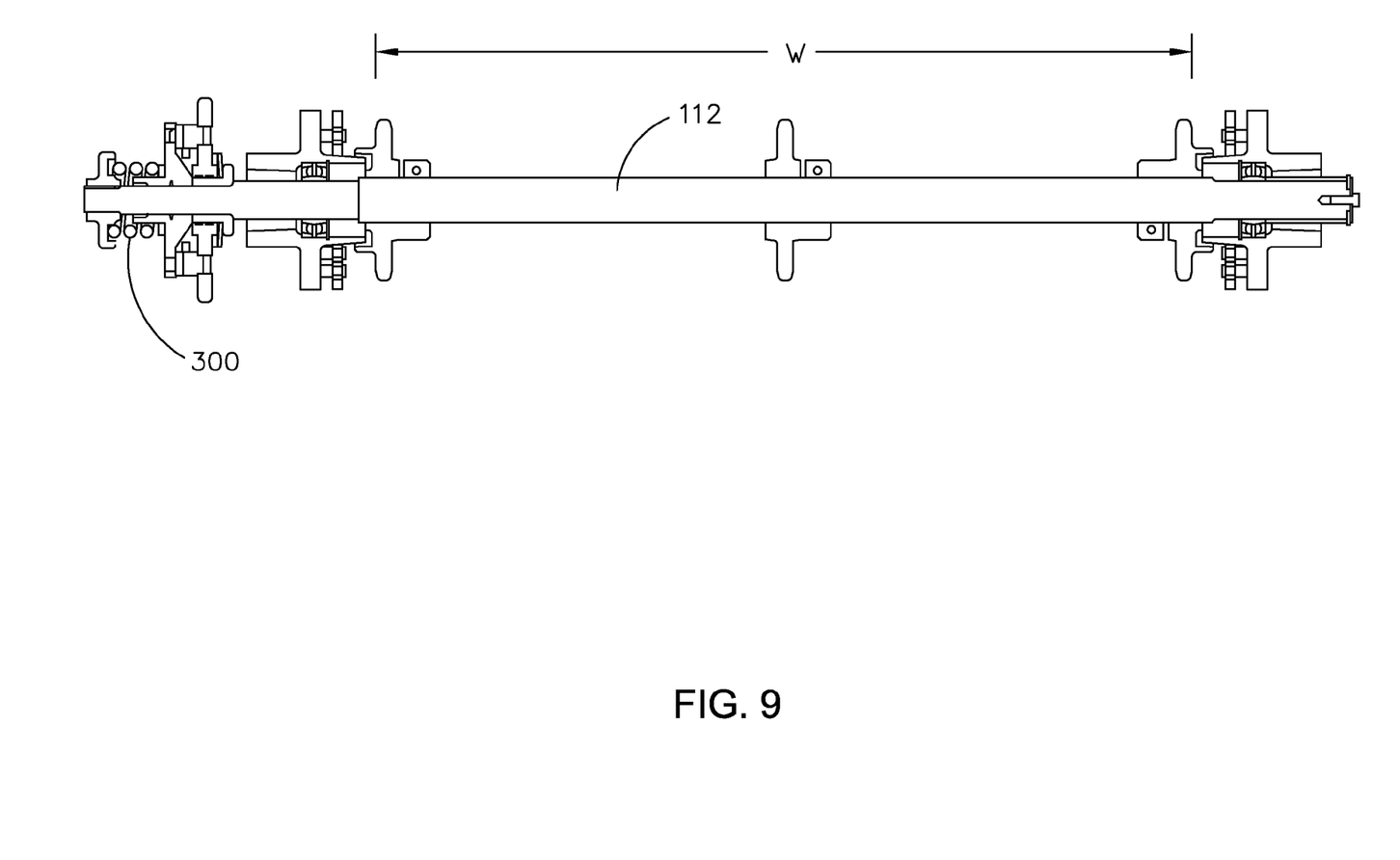
FIG. 9 is a cross-section view of another embodiment of a conveyor drive shaft assembly with a separate, external torque limiting device, in this case a jaw clutch.

One important aspect of the integral design is that the torque limiter is packaged within virtually the same space claim as the current shaft design occupies. That is, as seen in FIGS. 5 and 6, the integral torque limiter has substantially the same outer diameter as the conveyor drive shaft, and required no additional length (or width). FIG. 5 shows an integral design while FIG. 6 shows the currently employed design without an integral torque limiter. Detail of the integral torque limiter is shown in FIG. 7, and discussed below. Although space claims have not been much of a concern in the past, today's crop harvesting vehicles have become so large that they are beginning to reach the limits of what is legally allowed to pass down municipal roads. As a result, many of the components in and around the wheels and axles of the machine (including the feeder housing components) have very little space to operate in. The current, competitive external designs are increasingly hard to package within this confined space. So much so in fact that recently one competitor's design chose to locate their clutch elsewhere in the system just so they could manage the space constraint. FIGS. 8 and 9 show exemplary systems with external clutches. As shown, both FIGS. 8 and 9 employ an elongated through shaft 112a extending beyond the useable width W of the conveyor. A torque limiting device 300 is applied around this through shaft. In FIG. 8, the torque limiting device is an external radial pin clutch, while in FIG. 9 it is an external jaw clutch mechanism. In both, it is readily apparent that the external clutch must be outside the path of the conveyor, thus either protruding outwardly from the width of the conveyor or reducing the width of the useable conveyor space. It is readily apparent that these designs require much greater space and may not be readily retrofitted into existing combines, which simply may not have the available space.

Figure 1:
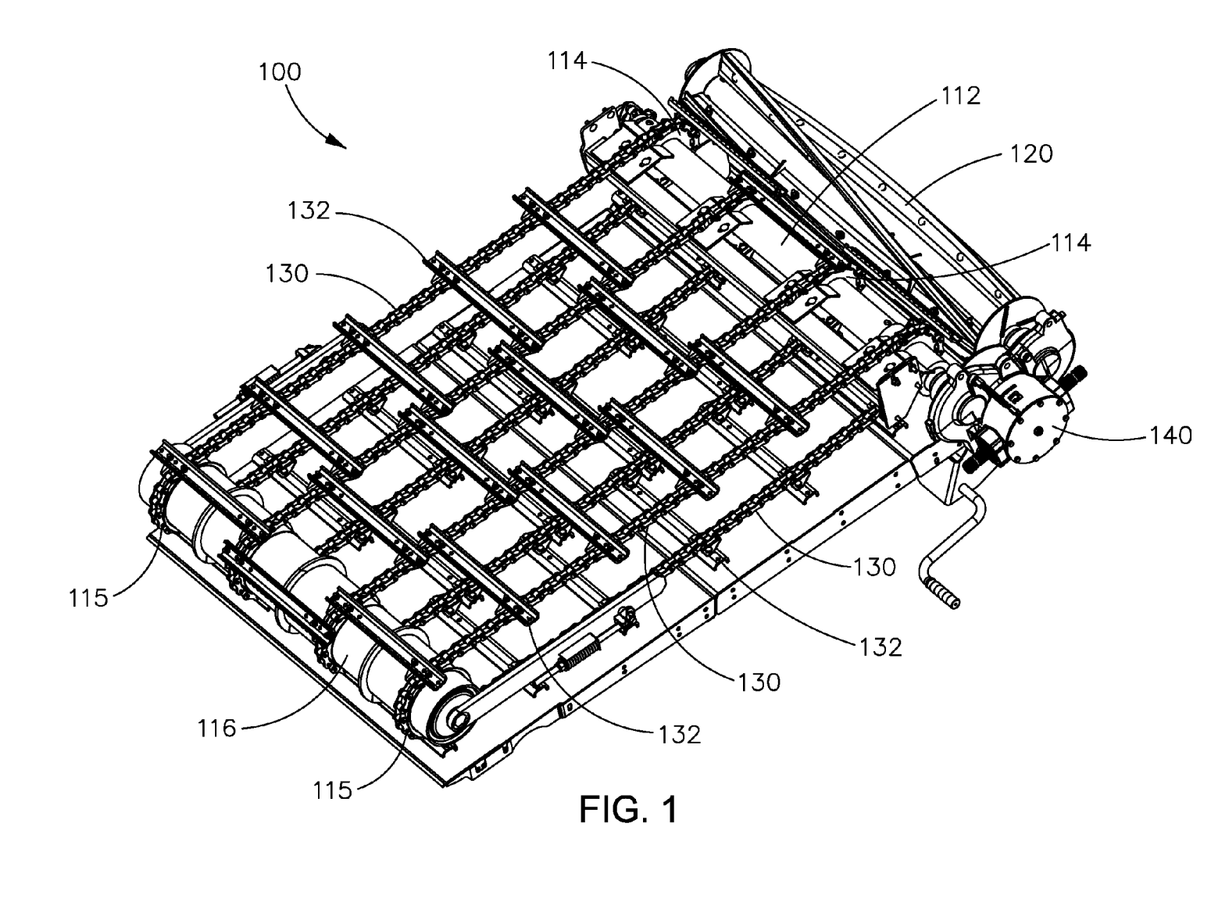
FIG. 1 is a perspective view of a conveyor assembly with rock beater.
Figure 2:
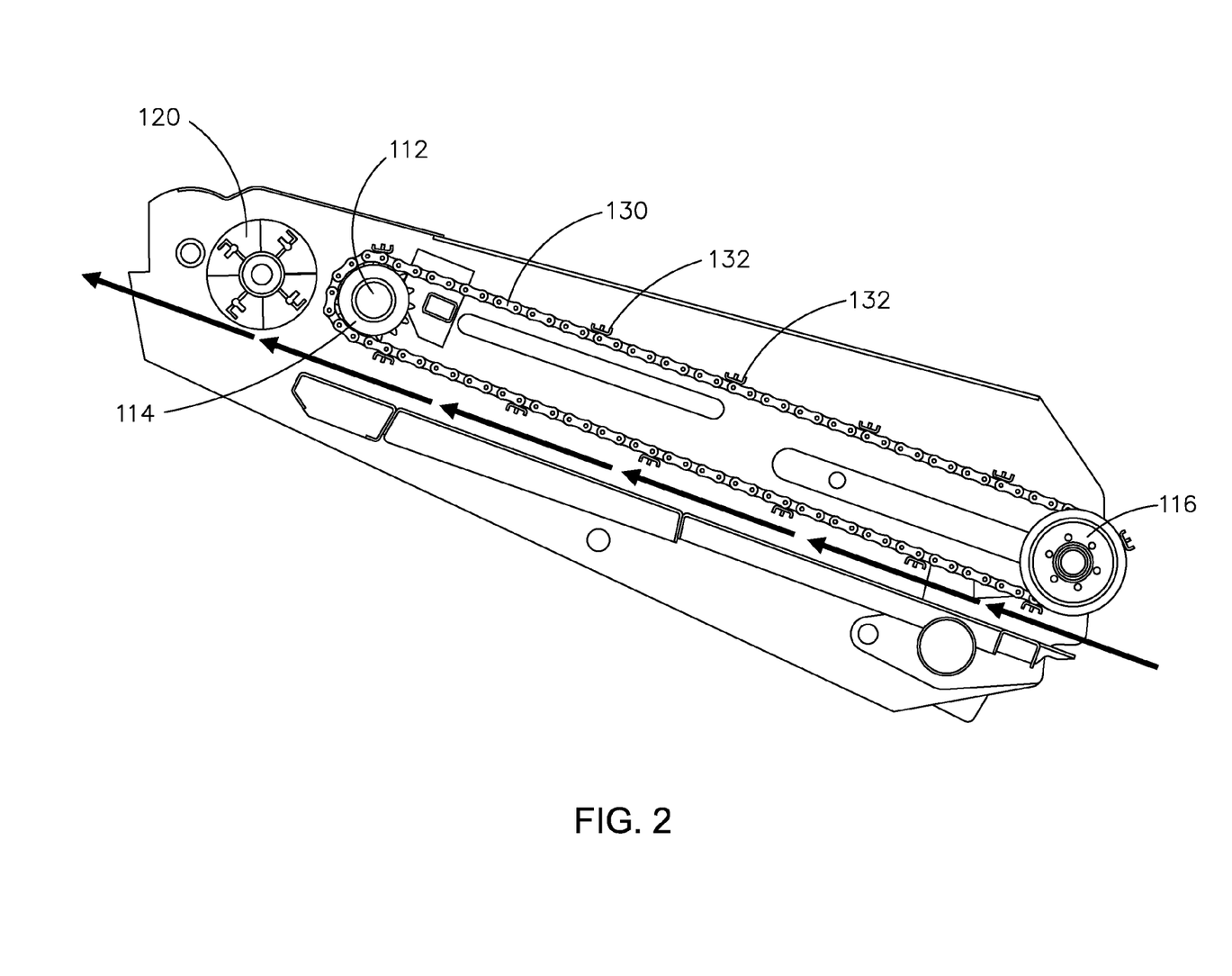
FIG. 2 is a side elevational view of a conveyor assembly with rock beater.

FIG. 1 shows an exemplary conveyor system 100 with a rock trap beater 120. In this instance, the gear box 140 contains a system of gears that drive both the conveyor drive shaft 112 and the rock trap beater 120. In other embodiments, the beater 120 may have an independent driver or the beater could be absent. The conveyor drive shaft 112 includes a plurality of sprockets 114 each of which engages a chain loop 130 which engages a matching sprocket 115 in a lower conveyor idler 116. The chains 130 are interconnected by a plurality of crop grabbers 132 which facilitate movement of the crop from the field to the thresher area. FIG. 2 is a side cut-away view showing crop travel under the chain conveyor.

Figure 3:
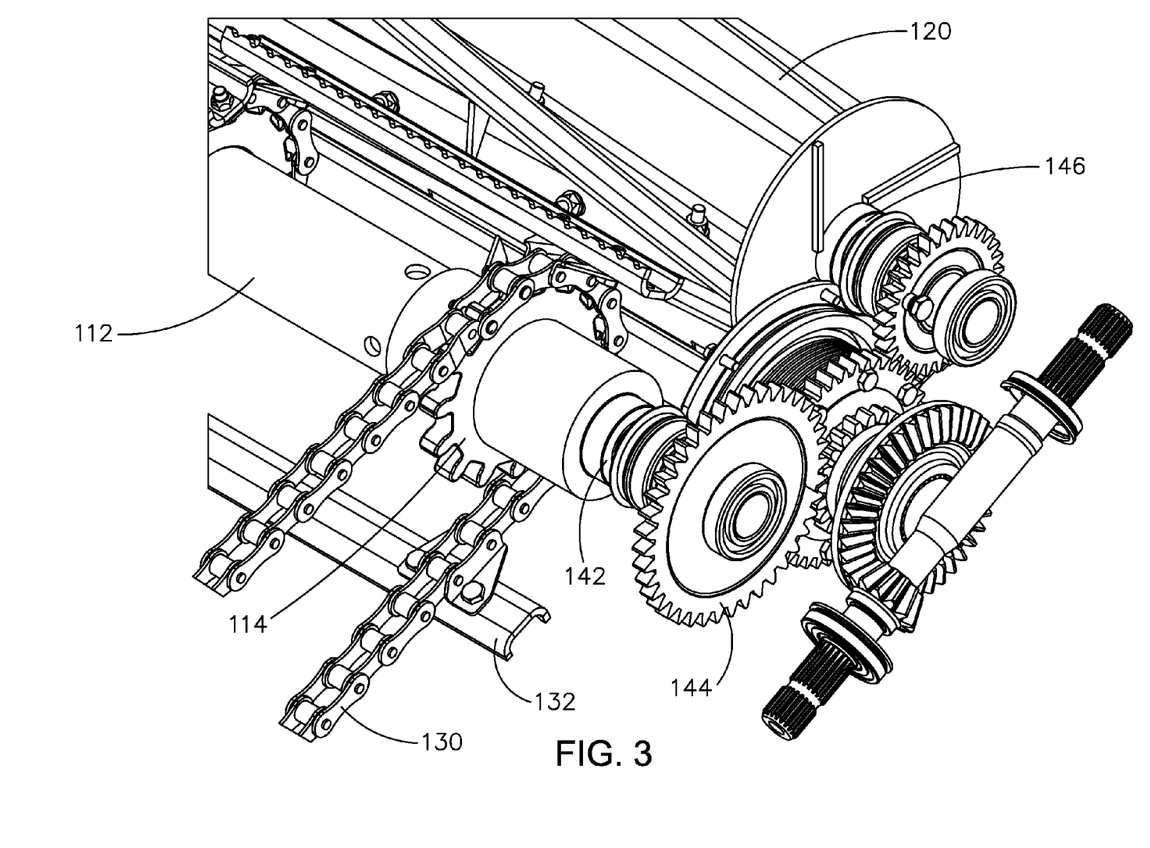
FIG. 3 is a perspective view of the arrangement of gears and drive shafts in one embodiment of a conveyor assembly disclosed herein.
Figure 4:
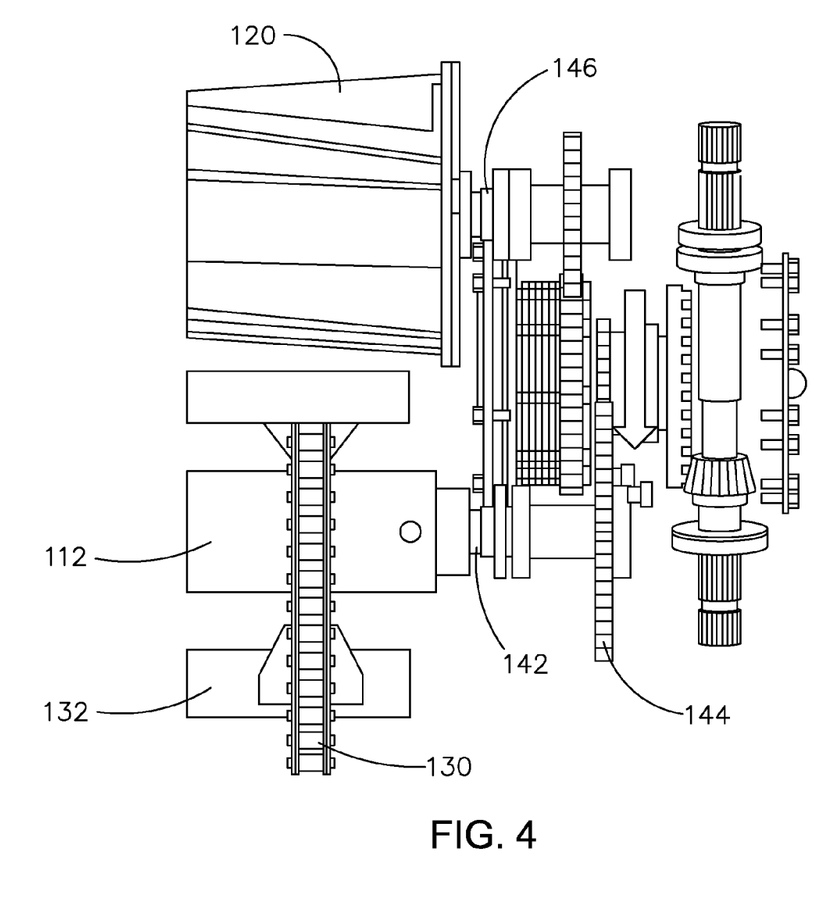
FIG. 4 is a plan view of the gear arrangement shown in FIG. 3.

FIGS. 3 and 4 shows an exemplary system using a single gear box 140 to drive both the rock trap beater 120 and the conveyor drive shaft 112. Notably, the two are connected by multiple gears 144 such that the movement of one would cause the movement of the other. A clutch is also provided to engage or disengage the drivers.

FIG. 5 is a cross-sectional view taken along line A-A in FIG. 2, and shows the location of the integral torque limiter 150, in this case a radial pin clutch, shown in more detail in FIG. 7. The drive gears drive the gear drive shaft 142, which engages the drive hub which includes an integral torque limiter 150, typically through an arrangement of mated splines 151 by which the gear drive shaft 142 engages the inner hub 158 of the integral torque limiter 150. At the opposite end of the conveyor drive shaft 112 a retaining hub 180 may be provided for supporting that end for rotation along the longitudinal axis. Under normal operation, the torque limiter 150 moves with the gear drive shaft 142 and in turn causes the conveyor drive shaft 112 to rotate. In the event the conveyor drive shaft 112 is stopped unexpectedly, an internal portion of the radial pin clutch 152 is allowed to continue to spin with the gear drive shaft 142, while the rest of the conveyor drive shaft 112 remains stopped, thus avoiding the build up of forces in the conveyor and resultant damage to the various parts.

For comparison, FIG. 6 is a similar cross-sectional view showing a traditional arrangement, where the conveyor drive shaft 112 has a hub 200 for engaging the gear drive shaft 142, but no integrated torque limiting device. In this arrangement, in the event the chain conveyor should stop or slow unexpectedly the gear drive shaft 142 continues to spin and continues to exert force on the conveyor drive shaft 112, resulting in potential damage to the gears or sprockets which could strip or fail, and/or the conveyor and its associated support components.

FIG. 7 depicts the integral radial pin clutch 152 employed in the integral torque limiting device described above. The radial pin clutch 152 comprises an outer hub 154, which is affixed to the conveyor drive shaft 112. Any method or means for affixing the outer hub 154 to the conveyor drive shaft 112 may be used. For robust performance, the outer hub 154 may be welded to the conveyor drive shaft 112, or perhaps its features are molded or shaped directly into the conveyor drive shaft 112 at manufacturing. The radial pin clutch 152 further comprises an inner hub 158, which is adapted for engaging the gear drive shaft 142. In some embodiments, the inner hub 158 mates to the gear drive shaft 142 with a power input spline 151, which ensures the gear drive shaft 142 transfers power to the inner hub 158. The inner hub 158, the outer hub 154, and the conveyor drive shaft 112 all share substantially the same longitudinal axis, i.e. they are substantially co-axial.

The inner hub 158 is freely rotatable along its longitudinal axis within the outer hub 154. To reduce or restrict the rotation, a plurality of cams 162 mounted on compression springs 164 are deployed between the inner and outer hubs 158, 154. As shown in FIG. 7, the inner hub 158 is provided with a plurality of radially disposed cavities 166, within each of which a compression spring (or springs) 164 is housed supporting a cam 162. The plurality of cams 162 are designed to engage an interior surface of the outer hub 154, preferably within one or more grooves 155, such that the contact between the cams 162 and the outer hub 154 permits movement of the outer hub 154 with movement of the inner hub 158. In this manner, when the gear drive shaft turns 142, it in turn causes rotation of the inner hub 158, which engages the outer hub 154 causing the outer hub 154 and the entire conveyor drive shaft 112 to rotate along with the gear drive shaft.

It will be appreciated that this arrangement will continue unless and until the force required to turn the conveyor drive shaft 112 is greater than the holding power of the cams 162. Once the holding power of the cams 162 is overcome, the inner hub 158 will operate independently, spinning freely within the outer hub 154, without causing it to move. Accordingly, no force is transferred to or from the conveyor drive shaft 112 which should limit damage to both the conveyor and drive systems.

By altering the force applied by the cams, by altering the number of cams used, the spring compression, etc. the amount of torque required can be altered. In some embodiments, the desired torque is set at the factory or during installation. In other embodiments, the desired torque may be selected by the operator. For example, a higher setting might be desirable for wet crops, which are heavier, in such instances, the operator could adjust the tension in the springs or perhaps be able to select the number of cams to be engaged. Any suitable means and methods of adjustment may be employed. In some embodiments, this could be achieved from within the operator compartment of the combine. The clutch can be run at the lowest setting required to convey crop so as to maximize the protection of the conveyor and associated components. To limit or prevent damage to the system, the torque may be set at from about 800 ft-lbs to about 1300 ft-lbs. In some embodiments, the torque limiting device may be set to slip at about 800 ft-lbs. to about 1000 ft-lbs. In some embodiments, the device is set to slip at about 1000 ft-lbs. These ranges provide a proper balance between driving the conveyor and protecting the system in the event of a jam under most circumstances. Those of skill in the art will recognize that these ranges are merely guidelines, and depending upon the specific circumstances and factors, higher or lower torque settings could be desirable. Setting the slip force too low would cause unnecessary slippage and stoppages resulting in reduced efficiency. On the other hand, setting the slip force too high would prevent appropriate slippage and could lead to unwanted damage and additional down time.

As should be apparent, the term "torque limiting device" or similar used herein is an automatic device that protects mechanical equipment, or its work, from damage by mechanical overload. A torque limiter may limit the torque by slipping, or uncouple the load entirely. Examples of torque limiting devices include but are not limited to disconnect type limiters, including but not limited to shear pin, ball detent, synchronous magnetic, pawl and spring type limiters, and clutch type limiters which include but are not limited to radial pin clutches, wet or dry friction plate clutches, magnetic particle clutches, magnetic hysteresis clutches, jaw type clutches, cut-out clutches, etc.

Depending upon the nature of the torque limiting device, it can be reset in a number of ways. Some devices may be reset simply by stopping the machine, reversing gears, and starting over. Others will have to be manually or remotely reset. There are advantages and disadvantages to each, in the end, reset should occur after the jam or blockage has been cleared.

Using the in-line torque limiter, such as the radial pin clutch, isolates the conveyor drive shaft and the entire conveyor assembly from both the gear drive shaft and the rock trap beater to protect each of those parts.

In some embodiments, the torque limiting device, particularly the radial pin clutch is provided as an integral part of the conveyor drive shaft. Such an embodiment is shown particularly in FIGS. 5 and 7. Such a system can be manufactured as a new equipment part, or retrofitted to an existing conveyor shaft, by cutting the existing conveyor shaft to accommodate the length of the radial pin clutch. In such instances, the outer hub of the radial pin clutch is preferably welded to the conveyor drive shaft, but in any event is securely affixed thereto for rotation therewith as a single piece. This design packages the torque limiting device in virtually the same space as the current design, minimizing the cost of updating previous vintages of machines. In some embodiments, the drive sprockets may be permanently affixed to the conveyor drive shaft and/or outer hub of the radial pin clutch or removably affixed in similar arrangements via mechanical or other fasteners, as is known in the art.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claim's cover be construed to all such equivalent variations as fall within the true spirit and scope of the invention.

What is claimed:

1. A conveyor drive shaft assembly comprising:
a longitudinal drive shaft comprising:
   a first end that includes a drive hub having an integral torque limiter adapted for coupling said drive hub to a gear drive shaft and adapted to slip at about 800 ft-lb to about 1300 ft-lb, wherein said integral torque limiter is a radial pin clutch arranged and affixed co-axially with respect to said longitudinal drive shaft, said radial pin clutch comprising:
      an outer hub affixed to the longitudinal drive shaft, and
      an inner hub affixed for rotation within said outer hub and for engagement with the gear drive shaft, said inner hub adapted for frictional engagement of the outer hub such that rotation of the inner hub causes rotation of the outer hub until a predetermined upper torque limit is achieved, whereupon said inner hub slips and rotates freely of said outer hub; and
   an opposed second end.

2. The conveyor drive shaft assembly of claim 1, wherein said integral torque limiter is adapted to slip at about 800 ft-lb to about 1000 ft-lb.

3. The conveyor drive shaft assembly of claim 1, wherein said longitudinal drive shaft is provided with a plurality of sprockets arranged and displaced along the length of said longitudinal drive shaft.

4. An agricultural combine feeder assembly comprising:
a conveyor drive shaft assembly comprising:
   a longitudinal drive shaft that includes:
      a first end having a drive hub that includes an integral torque limiter adapted for coupling said drive hub to a gear drive shaft, wherein the integral torque limiter is a radial pin clutch comprising:
         an outer hub affixed to the longitudinal drive shaft; and
         an inner hub affixed for rotation within said outer hub and for engagement with the gear drive shaft, said inner hub adapted for frictional engagement of the outer hub such that rotation of the inner hub causes rotation of the outer hub until a predetermine upper torque limit is achieved, whereupon said inner hub slips and rotates freely of said outer hub; and
      an opposed second end;
   a plurality of sprockets arranged and displaced along the length of said longitudinal drive shaft;
a lower conveyor idler; and
a plurality of chain loops, connecting said plurality of sprockets of said longitudinal drive shaft to said lower conveyor idler for rotation therewith.

5. A conveyor drive shaft assembly comprising:
a longitudinal drive shaft comprising:
   a first end that includes a drive hub having an integral torque limiter adapted for coupling said drive hub to a gear drive shaft and adapted to slip at about 800 ft-lb to about 1000 ft-lb, wherein said torque limiter is a radial pin clutch arranged and affixed co-axially with respect to said longitudinal drive shaft; and
   an opposed second end.

6. The conveyor drive shaft assembly of claim 5, wherein said radial pin clutch comprises:
   an outer hub affixed to said longitudinal drive shaft; and
   an inner hub affixed for rotation within said outer hub and for engagement with the gear drive shaft;
   wherein said inner hub is adapted for frictional engagement of the outer hub such that rotation of the inner hub causes rotation of the outer hub until a predetermined upper torque limit is achieved, whereupon said inner hub slips and rotates freely of said outer hub.

7. The conveyor drive shaft assembly of claim 5, wherein said longitudinal drive shaft is provided with a plurality of sprockets arranged and displaced along the length of said longitudinal drive shaft.

* * * * *